United States Patent
Mahnke

(10) Patent No.: US 8,423,608 B2
(45) Date of Patent: Apr. 16, 2013

(54) METHOD AND DEVICE FOR COMMUNICATING ACCORDING TO THE STANDARD PROTOCOL OPC UA IN A CLIENT/SERVER SYSTEM

(75) Inventor: Wolfgang Mahnke, Hetteleidelheim (DE)

(73) Assignee: ABB Research Ltd., Zurich (CH)

( * ) Notice: Subject to any disclaimer, the term of this patent is extended or adjusted under 35 U.S.C. 154(b) by 193 days.

(21) Appl. No.: 12/819,894

(22) Filed: Jun. 21, 2010

(65) Prior Publication Data

US 2010/0281097 A1    Nov. 4, 2010

Related U.S. Application Data

(63) Continuation of application No. PCT/EP2008/010295, filed on Dec. 5, 2008.

(30) Foreign Application Priority Data

Dec. 21, 2007   (DE) .......................... 10 2007 062 985

(51) Int. Cl.
*G06F 15/173* (2006.01)
(52) U.S. Cl.
USPC ............................. 709/203; 709/201; 709/227
(58) Field of Classification Search .......... 709/227–228, 709/201, 203
See application file for complete search history.

(56) References Cited

U.S. PATENT DOCUMENTS

| | | | | |
|---|---|---|---|---|
| 7,984,096 B2 * | 7/2011 | Beoughter et al. | ............ | 709/203 |
| 2002/0116453 A1 * | 8/2002 | Todorov et al. | ................ | 709/203 |
| 2005/0038885 A1 * | 2/2005 | Agrusa et al. | ................. | 709/223 |
| 2007/0067725 A1 * | 3/2007 | Cahill et al. | .................. | 715/733 |
| 2007/0074280 A1 | 3/2007 | Callaghan | | |
| 2009/0013082 A1 * | 1/2009 | Nara | ............................. | 709/228 |
| 2010/0005336 A1 * | 1/2010 | Jordan et al. | ...................... | 714/4 |

OTHER PUBLICATIONS

Craig Resnick, "OPC-UA, Linking the Legacy", Insigth 2006-22ECM, May 18, 2006, pp. 1-4.
Stefan-Helmut Leitner, et al., "OPC UA—Service-oriented Architecture for Industrial Applications" Software Technik Trends, vol. 26, No. 4, 2006, pp. 1-6.
International Search Report (PCT/ISA/210) dated Mar. 4, 2010.
Luth, Jim, "United Architecture—The future of OPC", ControlGlobal.com, Dec. 28, 2004, 4 pages.
Murphy, Eric, "OPC UA: 5 Things Everyone Needs to Know", MatrikonOPC, Alberta, Canada, 2009; 8 pages.

* cited by examiner

*Primary Examiner* — Abdullahi Salad
(74) *Attorney, Agent, or Firm* — Buchanan Ingersoll & Rooney PC

(57) ABSTRACT

A method and a corresponding device for communicating between clients and servers of a client/server system using an OPC UA protocol, OPC UA service calls can be used for the interaction of an OPC UA client with an OPC UA server. The OPC UA client requests additional services within an OPC UA session. The additional services are requested by a client part for using additional services and are handled by a server part for providing additional services.

5 Claims, 4 Drawing Sheets

METHOD AND DEVICE FOR COMMUNICATING ACCORDING TO THE STANDARD PROTOCOL OPC UA IN A CLIENT/SERVER SYSTEM

RELATED APPLICATIONS

This application claims priority as a continuation application under 35 U.S.C. §120 to PCT/EP2008/010295, which was filed as an International Application on Dec. 5, 2008 designating the U.S., and which claims priority to German Application 10 2007 062 985.2 filed in Germany on Dec. 21, 2007. The entire contents of these applications are hereby incorporated by reference in their entireties.

FIELD

The disclosure relates to a method and a device for communication, such as communication between clients and servers according to a standard protocol OPC UA. The method and the device are suitable for different applications, in particular for communication in automation systems.

BACKGROUND INFORMATION

OPC Unified Architecture (OPC UA) is a known standard protocol for manufacturer-independent communication, in particular in process automation, specified by the OPC Foundation. Although the original name for OPC was OLE for Process Control, OPC has been used without an indication of an abbreviation. UA stands for Unified Architecture.

FIG. 1 illustrates a known arrangement for interaction between an OPC UA client 1 and an OPC UA server 3 according to the OPC UA specification using a communication system 2, typically a network. In this case, in order to interact, the OPC UA client 1 can use OPC UA service calls from a set of OPC UA services specified in the OPC UA protocol. There are different technology mappings for transmitting OPC UA service calls via communication systems. TCP-based mapping and mapping based on web services currently exist.

For communication between an OPC UA client 1 and an OPC UA server 3, the OPC UA client 1 must set up an OPC UA session and call OPC UA services within the scope of such a session. Such OPC UA service calls within an OPC UA session cause the user context to be exchanged within the affected devices and cause execution in the security context of the OPC UA session.

FIG. 2 shows execution of an OPC UA session. FIG. 2 illustrates that an OPC UA client 1 can cause an OPC UA session to be set up in a first step 21 and calls OPC UA services in a second step 22. Actions by the OPC UA server 3 in order to verify the requests from the OPC UA client 1 are referred to as the third step 23. In a fourth step 24, the OPC UA session can be concluded. Responses are provided from the OPC UA server 3 to the OPC UA client 1.

The OPC UA standard can make it possible for an OPC UA client to use so-called subscriptions which can be managed by the OPC UA server and can possibly also remain valid beyond the duration of an OPC UA session. In this manner, an OPC UA client can conclude an OPC UA session and can subsequently reopen an OPC UA session, transfer subscriptions to the new OPC UA session and adopt all results from the earlier OPC UA session.

The OPC UA standard defines a set of OPC UA services for different tasks in process automation and other applications. However, additional services for complex tasks can be associated with some applications, for example, for complex configuration or engineering tasks which cannot be tackled or can be tackled only very laboriously using the defined OPC UA services. In addition, so-called legacy services may have already been defined, in which case such older mechanisms are also intended to be continued to be used—within the scope of so-called additional services—if appropriate when the OPC UA protocol is otherwise used.

FIG. 3 shows one known possibility for using additional services. The figure illustrates a client 31 which has been set up both as an OPC UA client 33 and as a client 35 for using additional services. A server 32 has both the function of an OPC UA server 34 and the function of a server 36 for providing additional services. The OPC UA client 31 and the OPC UA server 34 can communicate according to the OPC UA protocol. The client 35 for using additional services and the server 36 for providing additional services communicate in a completely separate manner using legacy service calls.

This known solution for using additional services can have issues both for the development and for the use of a corresponding system. The overall system can become complex and expensive because a plurality of components for managing communication are duplicated, for example those for implementing security mechanisms or for coding or encrypting data. The client sets up an OPC UA session in order to use OPC UA services and additionally sets up something similar in order to be able to use additional services, in which case additional security measures are involved. For the duration of the two parallel sessions, resources can additionally be used both on the client side and on the server side, which has an effect on the required storage capacity, processing speed and network use, for example.

SUMMARY

A method is disclosed for communication between a client and a server in a client/server system using an OPC UA protocol, wherein OPC UA service calls are used for interaction between an OPC UA client and an OPC UA server. The method includes calling additional services within an OPC UA session with the OPC UA client, the additional services being called by an additional client part for using additional services, and providing additional services by an additional server part of the server.

A device is disclosed for communication between a client and a server in a client/server system using an OPC UA protocol, wherein OPC UA service calls can be used for interaction between an OPC UA client and an OPC UA server. The device includes the OPC UA client for calling additional services within an OPC UA session for use by an additional client part present in the OPC UA client in order to call additional services; and an additional server part, for providing additional services implemented in the OPC UA server.

BRIEF DESCRIPTION OF THE DRAWINGS

A further explanation of the disclosure and exemplary advantages are set forth in the following description of exemplary embodiments using the figures of the drawings, in which.

DETAILED DESCRIPTION

The disclosure describes an exemplary method and an exemplary device for making it possible to integrate additional services into the framework of OPC UA services.

The disclosure therefore describes an exemplary method in which the OPC UA client can call additional services within an OPC UA session. The additional services can be called by a client part which supplements a standard client and can use additional services and can be handled by a server part which can supplement a standard server and provide additional services.

Figure 1:
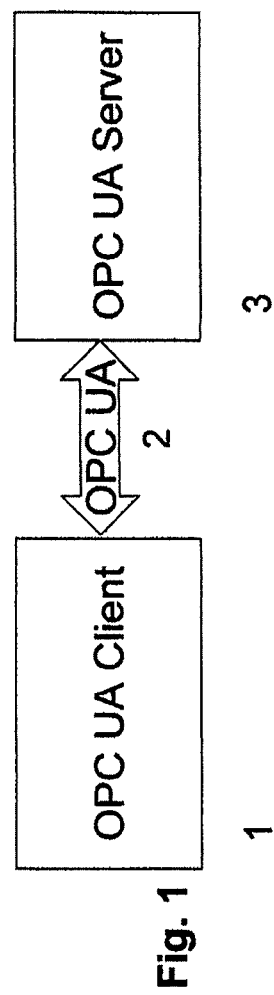
FIG. 1 shows a known arrangement containing an OPC UA client and an OPC UA server.
Figure 2:
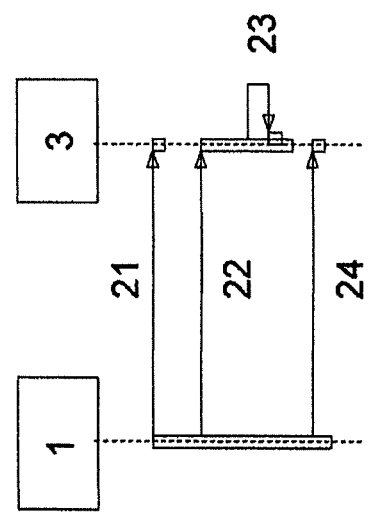
FIG. 2 shows known execution of an OPC UA session.
Figure 3:
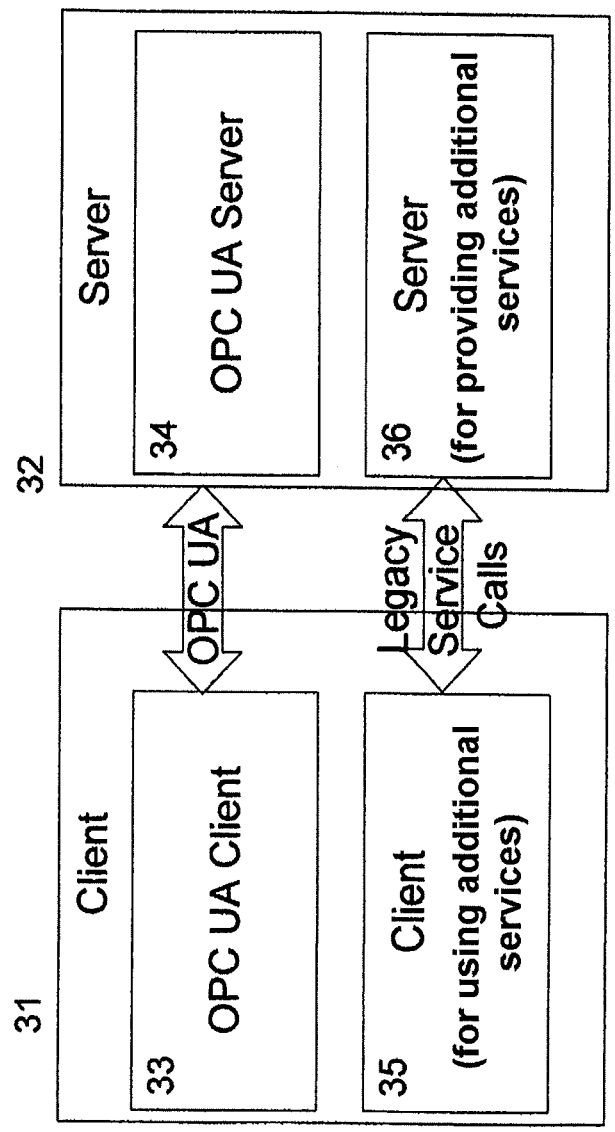
FIG. 3 shows one known possibility for using additional services.
Figure 4:
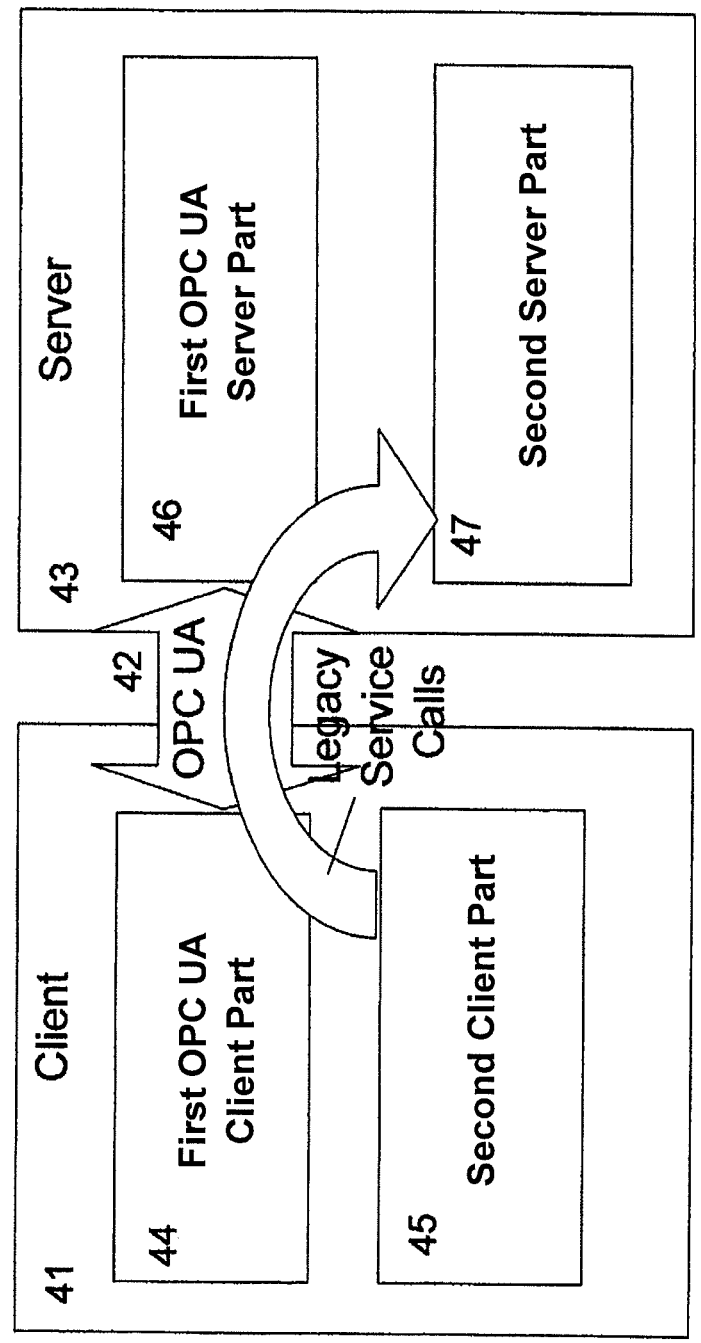
FIG. 4 shows an exemplary solution according to the disclosure for integrating additional services into the framework of OPC UA services.

FIG. 4 shows an exemplary arrangement according to the disclosure containing a client 41 and a server 43 which are connected by a communication device 42. The client 41 contains a first (e.g., supplemental, dedicated) OPC UA client part 44 for calling OPC UA services and a second (e.g., supplemental, dedicated) client part 45 for using additional services. The server 43 correspondingly contains a first OPC UA server part 46 for providing OPC UA services and a second server part 47 for providing additional services. The additional services or legacy services are integrated into the OPC UA service framework. As a result, additional services can be called within the scope of an OPC UA session which has been set up. OPC UA security mechanisms can also be used and, if desired, the data can also be coded for transmission. Nevertheless, the parameters for calls by the client and responses from the server match the parameters of the additional services. The client 41 therefore calls the additional services by its second client part 45 and using the corresponding parameters and receives a response from the second server part 47.

Figure 5:
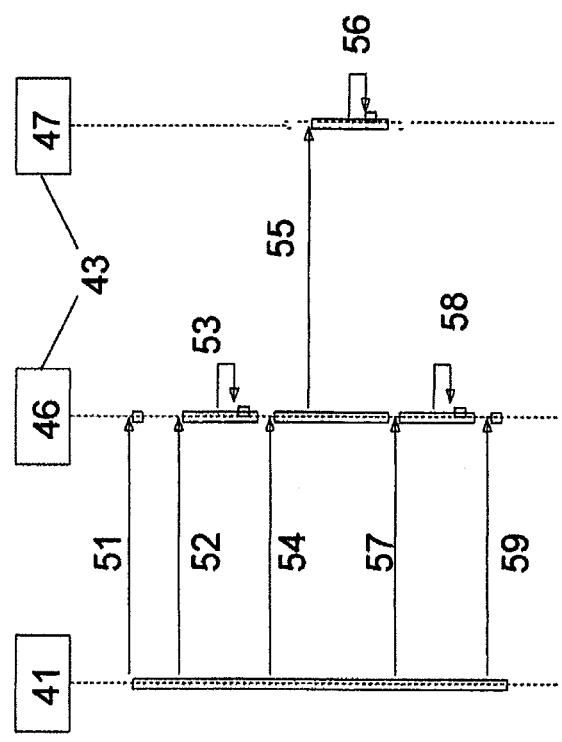
FIG. 5 shows an exemplary flowchart when integrated additional services are used.

FIG. 5 illustrates, by way of example, sequences of the execution of an OPC UA session, in which case responses from the server are not shown. In a first operation 51, the client 41 can make contact with the server 43 in order to set up an OPC UA session. In a second step 52, the client 41 can use its first OPC UA client part 44 to call OPC UA services, according to the standard, which are handled by the first OPC UA server part 46 of the server 43 in a third step 53. The figure also illustrates that the client 41 can also call additional services within the scope of the existing OPC UA session, for example, in a fourth step 54, which additional services can be forwarded to the second server part 47 in a fifth step 55 and can be handled by the server part in a sixth step 56. In a seventh step 57, the client 41 can then call OPC UA services again which are handled by the first OPC UA server part 46 in an eighth step 58. In the ninth step 59, the OPC UA session can be ended in a known manner.

In a similar manner to the abovementioned subscriptions which can also remain valid beyond the duration of an OPC UA session, additional services can also manage a corresponding status. In an exemplary system according to the disclosure, the client 41 can set up a new OPC UA session and can transfer subscriptions to the new OPC UA session. In this manner, the use of OPC UA as an intermediate level or an intermediate layer can help to expand the functionality of legacy services.

In order to integrate additional services into the OPC UA service framework, as proposed above according to the disclosure, the component which manages communication according to the OPC UA standard, that is to say the OPC UA stack, can be expanded both on the client side and on the server side in order to support the calling of additional services. Despite the expansion of the OPC UA stack, the client and the server can also cooperate with servers or clients in the system which has not been expanded. However, an expanded client can call only the OPC UA services of a server which has not been expanded, i.e. cannot call any additional services from the latter. In a corresponding manner, a server which has been expanded cannot receive any calls for additional services if the calling client has not been expanded.

An exemplary manner in which an expanded OPC UA client cooperates with an expanded OPC UA server can be described by the characteristics below:

The client initiates an OPC UA session. This includes information relating to the user, client certificates, security details and coding, some of such settings being made by the standard secure channel establishment in the case of OPC UA.

Just like clients which have not been expanded, the client can use OPC UA services.

The additional services can optionally be listed in the address space of OPC UA. For example, a client can use standard OPC UA communication to obtain information relating to available additional services.

The client can either—as mentioned above—obtain information relating to additional services from information in the address space, if this option has been set up, or from other sources.

The client can call additional services within an OPC UA session.

The client can optionally also use the cancel service of OPC UA to terminate a call for additional services.

The OPC UA server can optionally use OPC UA events to show the client data from an additional service call. These data can contain, for example, information relating to how far the service has progressed and what intermediate results there are.

The client can conclude an OPC UA session. Depending on the additional service, the service life of such services can be independent of the duration of a session and the services can thus still exist after a session has been concluded or can be erased after the session has been concluded.

As explained above, it can be desired to expand the OPC UA stack in order to implement the disclosure. In order to avoid the associated development outlay, an alternative solution can be to pack additional services in OPC UA methods without expanding the protocol. In this case, the server can put additional services to be provided in a so-called wrapper component. Such services could be web services defined, for example, in WSDL (Web Services Description Language). Mapping to input and output parameters of OPC UA methods, for example in automated fashion, would be suitable for call and response parts of the services. Services which were called using OPC UA methods can be aborted by aborting the method service call of OPC UA. In this solution, the client can likewise require a wrapper or wrapping component in order to pack service calls into an OPC UA method and in order to convert output parameters of the call into a service response. A solution according to the disclosure for integrating additional services into the OPC UA service framework can be considered to be advantageous for a plurality of reasons, for example additional mapping overhead and unfavorable representation of the services in the OPC UA address space.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The scope of the invention is indicated by the appended claims rather than the foregoing description and all changes that come within the meaning and range and equivalence thereof are intended to be embraced therein.

What is claimed is:

1. A method for communication between a client and a server in a client/server system using an OPC UA protocol, wherein OPC UA service calls are used for interaction between an OPC UA client and an OPC UA server, the method comprising:

calling additional services within an OPC UA session with the OPC UA client, the additional services being called by an additional client part for using additional services; and providing additional services by an additional server part of the server, wherein, in order to integrate the additional services into the OPC UA service framework, either a standard OPC UA stack is expanded both on the client side and on the server side, or a wrapper component is required by the client in order to pack service calls into an OPC UA method and the additional services to be provided are put by the server in the wrapper component.

2. The method as claimed in claim 1, comprising:

using a standard OPC UA cancel service to terminate a call for the additional services with the OPC UA client.

3. The method as claimed in claim 1, wherein, for communication between an OPC UA client and an OPC UA server using additional services, comprising:

setting up an OPC UA session, calling additional services with the OPC UA client, providing additional services by forwarding such calls from the OPC UA client to its server part with the OPC UA server, handling the call for additional services with the server part, and terminating the OPC UA session wherein the OPC UA client concludes all transactions, including those using additional services, by a standard call.

4. The method as claimed in claim 1, comprising:

obtaining information relating to the additional services from a standard OPC UA address space with the OPC UA client.

5. A device for communication between a client and a server in a client/server system using an OPC UA protocol, wherein OPC UA service calls can be used for interaction between an OPC UA client and an OPC UA server, the device comprising:

an OPC UA client for calling additional services within an OPC UA session for use by an additional client part present in the OPC UA client; and an additional server part, for providing the additional services, implemented in the OPC UA server, wherein, in order to integrate the additional services into the OPC UA service framework, either a standard OPC UA stack is expanded both on the client side and on the server side, or the client is arranged to require a wrapper component in order to pack service calls into an OPC UA method and the server is arranged to put the additional services to be provided in the wrapper component.

* * * * *